US011025761B1

(12) United States Patent
Shim et al.

(10) Patent No.: US 11,025,761 B1
(45) Date of Patent: Jun. 1, 2021

(54) MOBILE TERMINAL

(71) Applicant: LG ELECTRONICS INC., Seoul (KR)

(72) Inventors: Hongjo Shim, Seoul (KR); Sunwon Yoo, Seoul (KR); Jungwhan Kim, Seoul (KR); Hyunwoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/821,902

(22) Filed: Mar. 17, 2020

(30) Foreign Application Priority Data

Jan. 2, 2020 (WO) ............... PCT/KR2020/000065

(51) Int. Cl.
*H04M 1/02* (2006.01)
*H01Q 1/24* (2006.01)
*H04M 1/72412* (2021.01)

(52) U.S. Cl.
CPC .......... *H04M 1/0266* (2013.01); *H01Q 1/243* (2013.01); *H04M 1/72412* (2021.01); *H04M 2250/12* (2013.01)

(58) Field of Classification Search
CPC ................ G06F 3/016; G06F 1/169; G06F 2203/04105; G06F 1/1626; G06F 3/017; G06F 3/04144
See application file for complete search history.

(56) References Cited

U.S. PATENT DOCUMENTS

| | | | | |
|---|---|---|---|---|
| 9,024,870 | B2* | 5/2015 | Kim | G06F 1/1684 345/156 |
| 9,525,764 | B1* | 12/2016 | Evans, V | H04M 1/23 |
| 9,945,818 | B2* | 4/2018 | Ganti | G01N 29/09 |
| 10,599,223 | B1* | 3/2020 | Amin-Shahidi | H03K 17/9625 |
| 10,620,591 | B2* | 4/2020 | Rothkopf | G06F 3/016 |
| 10,861,908 | B2* | 12/2020 | Seomoon | G06F 3/044 |
| 2002/0025837 | A1* | 2/2002 | Levy | G06F 3/0446 455/566 |

(Continued)

FOREIGN PATENT DOCUMENTS

| | | |
|---|---|---|
| JP | 2009538474 | 11/2009 |
| JP | 2017537416 | 12/2017 |

(Continued)

OTHER PUBLICATIONS

PCT International Application No. PCT/KR2020/000065, Notification of Transmittal of the International Search Report and the Written Opinion of the International Searching Authority, or Declaration datedSep. 29, 2020 , 11 pages.

*Primary Examiner* — Dung Hong
(74) *Attorney, Agent, or Firm* — Lee, Hong, Degerman, Kang & Waimey

(57) ABSTRACT

Disclosed herein is a mobile terminal capable of indicating the position of a force sensor arranged inside a side case using the shape of a non-conductive mold disposed between conductive members to sense pressure. For the mobile terminal, a user input unit and an antenna may be arranged to overlap each other, and a bump and a recess may be formed using a non-conductive mold that is easy to process. Accordingly, uniformity of appearance may be maintained without forming a bump and a recess on the conductive member.

14 Claims, 12 Drawing Sheets

(56) References Cited

U.S. PATENT DOCUMENTS

| | | | | |
|---|---|---|---|---|
| 2004/0008038 A1* | 1/2004 | Morimoto | ............ | G01R 27/2605 324/661 |
| 2004/0104727 A1* | 6/2004 | Morimoto | ............ | G01D 5/2417 324/409 |
| 2006/0197753 A1* | 9/2006 | Hotelling | ............ | G06F 3/0412 345/173 |
| 2007/0264743 A1* | 11/2007 | Vaganov | ............ | G06F 3/0338 438/51 |
| 2008/0122315 A1* | 5/2008 | Maruyama | ............ | H01L 41/053 310/314 |
| 2009/0140996 A1* | 6/2009 | Takashima | ............ | G06F 3/0338 345/173 |
| 2010/0013775 A1* | 1/2010 | Son | ............ | G06F 3/0447 345/168 |
| 2011/0141052 A1* | 6/2011 | Bernstein | ............ | G06F 3/03547 345/174 |
| 2012/0112894 A1* | 5/2012 | Yang | ............ | G06F 3/016 340/407.1 |
| 2014/0218330 A1* | 8/2014 | Ady | ............ | G06F 3/044 345/174 |
| 2016/0056526 A1* | 2/2016 | Li | ............ | H01Q 9/42 343/702 |
| 2017/0068359 A1* | 3/2017 | Ahn | ............ | G06F 3/047 |
| 2017/0102809 A1* | 4/2017 | Son | ............ | G06F 3/0447 |
| 2017/0359063 A1* | 12/2017 | Oberhauser | ............ | H03K 17/962 |
| 2017/0371380 A1* | 12/2017 | Oberhauser | ............ | G06F 3/041 |
| 2018/0083620 A1* | 3/2018 | Bushnell | ............ | G06F 1/1656 |
| 2018/0088635 A1* | 3/2018 | Fomin | ............ | G06F 1/1656 |
| 2018/0129355 A1* | 5/2018 | Lynn | ............ | G06F 3/0227 |
| 2018/0217668 A1* | 8/2018 | Ligtenberg | ............ | G06F 3/017 |
| 2018/0293420 A1* | 10/2018 | Kim | ............ | G06K 9/0002 |
| 2018/0314331 A1* | 11/2018 | Doll | ............ | G06F 3/041 |
| 2018/0328799 A1* | 11/2018 | Park | ............ | G06F 3/04164 |
| 2018/0356926 A1* | 12/2018 | Park | ............ | G06F 3/016 |
| 2019/0004662 A1* | 1/2019 | Gagne-Keats | ............ | G06F 3/0416 |
| 2019/0045642 A1* | 2/2019 | Prest | ............ | H05K 5/006 |
| 2020/0033815 A1* | 1/2020 | Bushnell | ............ | G04G 17/045 |
| 2020/0042131 A1* | 2/2020 | Lee | ............ | G06F 3/04142 |
| 2020/0042132 A1* | 2/2020 | Kong | ............ | H04M 1/236 |
| 2020/0057507 A1* | 2/2020 | Park | ............ | G06F 3/04142 |
| 2020/0073445 A1* | 3/2020 | Kuna | ............ | H01Q 1/2258 |
| 2020/0159358 A1* | 5/2020 | Hong | ............ | G01L 1/142 |
| 2020/0348795 A1* | 11/2020 | Bechstein | ............ | G06F 3/0445 |
| 2020/0371659 A1* | 11/2020 | Kim | ............ | G06F 3/04142 |

FOREIGN PATENT DOCUMENTS

| | | |
|---|---|---|
| KR | 1020100035475 | 4/2010 |
| KR | 101928902 | 12/2018 |
| KR | 1020190098658 | 8/2019 |

\* cited by examiner (a)

(b)

(a)

(b)

(a)

(b)

(a)

(b)

(c)

(a)

(b)

(c)

(d)

(a)

(b)

(c)

(d)

(a)

(b)

MOBILE TERMINAL

CROSS-REFERENCE TO RELATED APPLICATIONS

Pursuant to 35 U.S.C. 119(a), this application claims the benefit of earlier filing date and right of priority to International Application No. PCT/KR2020/000065, filed on Jan. 2, 2020, the contents of which are hereby incorporated by reference herein in its entirety.

BACKGROUND

Field

The present disclosure relates to a mobile terminal having an antenna and a user input in a limited space.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device equipped with functions of receiving, processing and displaying user-viewable images. The display device, for example, receives broadcasting selected by a user from broadcast signals broadcasted by a broadcasting station, splits video signals from the received signals, and displays the split video signals on a display.

Recently, owing to the developments of broadcast and network technologies, functions of a display device have been considerably diversified and performance of the device has been improved correspondingly. Namely, the display device has been developed so as to provide a user with various contents as well as simply broadcasted contents. For example, the display device can provide game play, listening to music, Internet shopping, user-customized information and the like using various applications as well as programs received from broadcasting stations. In order to perform such extended functions, the display device is basically connected to other devices or a network using various communication protocols and is able to provide ubiquitous computing environments to a user. Namely, the display device has been evolved into a smart device that enables connectivity to a network and ubiquitous computing.

As display devices have evolved smart devices, various types of wireless communication technology are applied. In addition, a mobile communication scheme, such as Long Term Evolution (LTE), requires multiple antennas to secure performance and meet the standards of various operators. Therefore, the number of antennas mounted in a mobile terminal is increasing.

Wireless communication technology for antennas is affected by metal or electronic components located in the vicinity. Accordingly, there are constraints on arrangement of antennas, and it is difficult to mount various antennas. In particular, in order to increase the radio signal transmission/reception rate of an antenna, the antenna may be arranged on the outer side of a mobile terminal. However, there is a difficulty in disposing the antenna together with a user input unit or an interface on the outer side of the mobile terminal.

SUMMARY OF THE DISCLOSURE

An object of the present disclosure is to provide a mobile terminal having an antenna and a user input in a limited space.

To achieve these objects and other advantages and in accordance with the purpose of the disclosure, as embodied and broadly described herein, a mobile terminal may include a side case comprising a plurality of conductive members and a non-conductive mold, a display arranged on a front surface of the side case, a rear case arranged on a rear surface of the side case, a force sensor arranged inside the side case, and a controller configured to perform a predetermined function when the force sensor senses a pressure, wherein the non-conductive mold comprises an outer mold exposed to an outside through a slit between the plurality of conductive members, wherein outer surfaces of the conductive member have a different height from the outer mold.

The force sensor may be disposed at a position corresponding to the outer mold.

The outer mold may have a size greater than or equal to an area occupied by the force sensor.

A mark corresponding to a function set in the force sensor may be formed on the outer mold in relief or intaglio.

The force sensor may include a plurality of force sensor, wherein the outer mold may be arranged between the plurality of force sensors.

The force sensor may include a plurality of force sensor, wherein the outer mold may cover the plurality of force sensors simultaneously, and wherein positions corresponding to spaces between the plurality of force sensors and exposed to an outside may be at a different height from positions corresponding to the plurality of force sensors.

The mobile terminal may further include an array antenna disposed at a position corresponding to the outer mold so as to overlap the plurality of force sensors.

The outer mold may be formed to be lower than the conductive members.

The outer mold may be formed to be higher than the conductive members.

A bump or a recess may be formed in the outer mold.

The slit and the conductive members may form a step.

Alternatively, the non-conductive mold exposed through the slit may include a curved surface.

The non-conductive mold may further include an inner mold arranged on an inner surface of the conductive members, wherein the outer mold exposed through the slit may be thicker than the inner mold.

The mobile terminal may further include a wireless communication unit configured to transmit and receive a wireless signal by supplying power to the conductive members.

The force sensor may include a first force sensor arranged on a left side of the mobile terminal and a second force sensor arranged on a right side of the mobile terminal, wherein the wireless communication unit may be connected to each of a first conductive member arranged on the left side and a second conductive member arranged on the right side. The controller may be configured to perform wireless communication through the second conductive member when a pressure is sensed by the first force sensor and to perform wireless communication through the first conductive member when a pressure is sensed by the second force sensor.

The mobile terminal of the present disclosure may not require the position of a button to be changed to mount an antenna. Accordingly, an antenna may be mounted without degrading the usability.

In addition, wireless communication performance may be secured by preventing buttons from lowering the performance of the antenna.

Further, the position of the user input unit may be indicated with the outer mold positioned between conductive members. Accordingly, it is not necessary to add an element which may degrade the design of the outer appearance.

Further scope of applicability of the present disclosure will become apparent from the detailed description given below. However, various changes and modifications within the spirit and scope of the present disclosure may be clearly understood by those skilled in the art, and therefore the detailed description and specific embodiments, such as the preferred embodiments of the present disclosure, should be understood as being given by way of example only.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
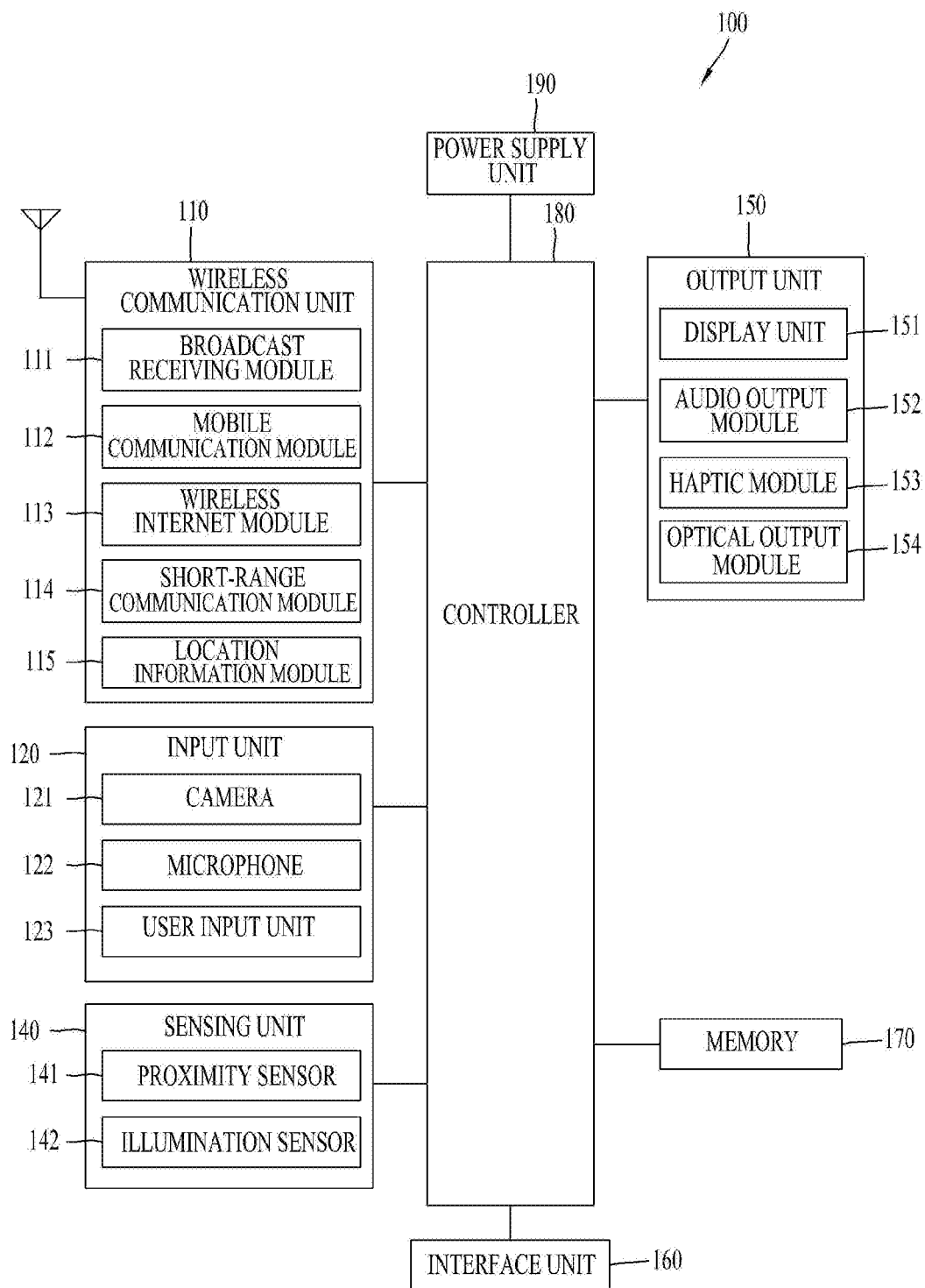
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access0), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Positioning System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access0), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
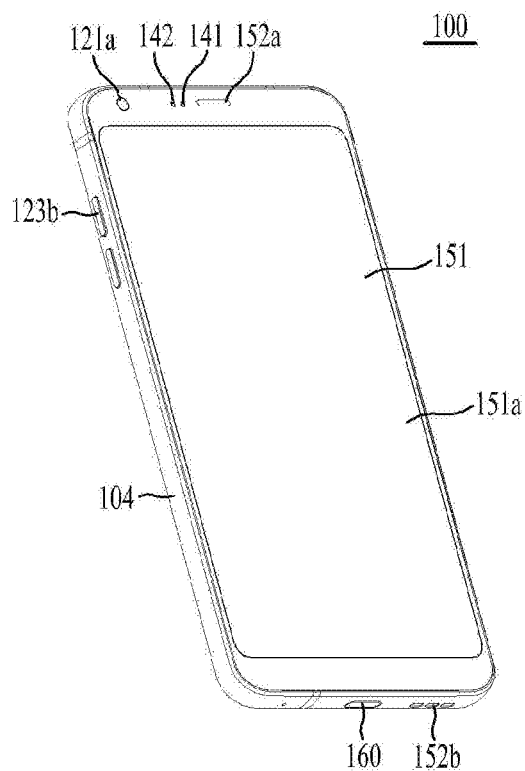
FIGS. 2 and 3 are a front perspective view and a rear perspective view of the mobile terminal in accordance with the present disclosure.
Figure 3:
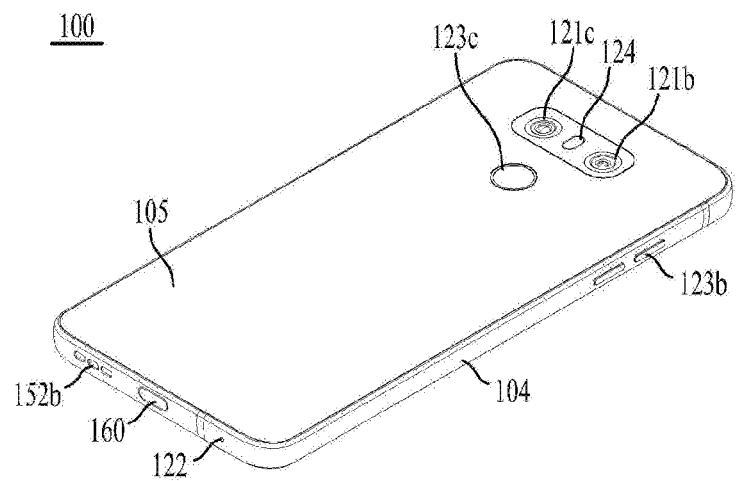

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case and a rear case 105. Various electronic components are incorporated into a space formed between the front case and the rear case 105. At least one middle case may be additionally positioned between the front case and the rear case 105.

The display unit 151 is shown located on the front side of the terminal body to output information. As illustrated, a window 151a of the display unit 151 may be mounted to the front case to form the front surface of the terminal body together.

In some embodiments, electronic components may also be mounted to the rear case 105. Examples of such electronic components include a detachable battery, an identification module, a memory card, and the like. Rear cover is shown covering the electronic components, and this cover may be detachably coupled to the rear case 105. Therefore, when the rear cover is detached from the rear case 105, the electronic components mounted to the rear case 105 are externally exposed.

As illustrated, when the rear cover is coupled to the rear case 105, a side surface of the rear case 105 is partially exposed. In some cases, upon the coupling, the rear case 105 may also be completely shielded by the rear cover. In some embodiments, the rear cover may include an opening for externally exposing a camera 121b or an audio output module 152b.

The cases 104 and 105 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case, between the front case and the rear case 105, or between the rear case 105 and the rear cover, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 2 and 3. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case). In this case, a hole independently formed to output audio sounds may not be seen or is otherwise hidden in terms of appearance, thereby further simplifying the appearance and manufacturing of the mobile terminal 100.

The optical output module 154 may be configured to output light for indicating an event generation. Examples of such events include a message reception, a call signal reception, a missed call, an alarm, a schedule notice, an email reception, information reception through an application, and the like. When a user has checked a generated event, the controller may control the optical output unit 154 to stop the light output.

The first camera 121a may process image frames such as still or moving images obtained by the image sensor in a capture mode or a video call mode. The processed image frames may then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user may easily manipulate it using a forefinger when the user grabs the terminal body with one hand. Alternatively, the rear input unit may be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 may have a larger screen.

As a further alternative, the mobile terminal 100 may include a finger scan sensor which scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, second camera 121b may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the second camera 121b, the flash 124 may illuminate the subject.

The second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1). may be retractable into the terminal body. Alternatively, an antenna may be formed using a film attached to an inner surface of the rear cover, or a case that includes a conductive material.

A power supply unit 190 for supplying power to the mobile terminal 100 may include a battery, which is mounted in the terminal body or detachably coupled to an outside of the terminal body.

The battery may receive power via a power source cable connected to the interface unit 160. Also, the battery may be recharged in a wireless manner using a wireless charger. Wireless charging may be implemented by magnetic induction or electromagnetic resonance.

The rear cover is shown coupled to the rear case 105 for shielding the battery, to prevent separation of the battery, and to protect the battery from an external impact or from foreign material. When the battery is detachable from the terminal body, the rear case may be detachably coupled to the rear case 105.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 4:
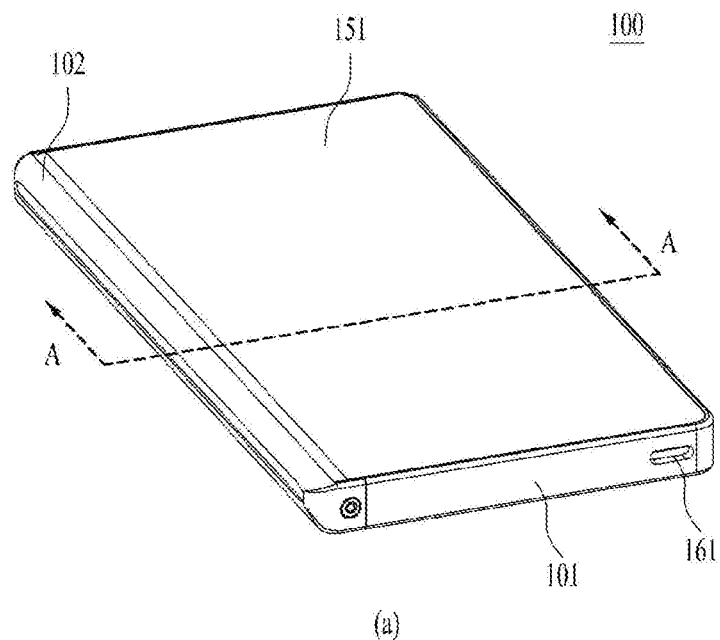
FIGS. 4 and 5 are a front perspective view and a rear view showing a first state and a second state of the mobile terminal in accordance with the present disclosure.
Figure 4:
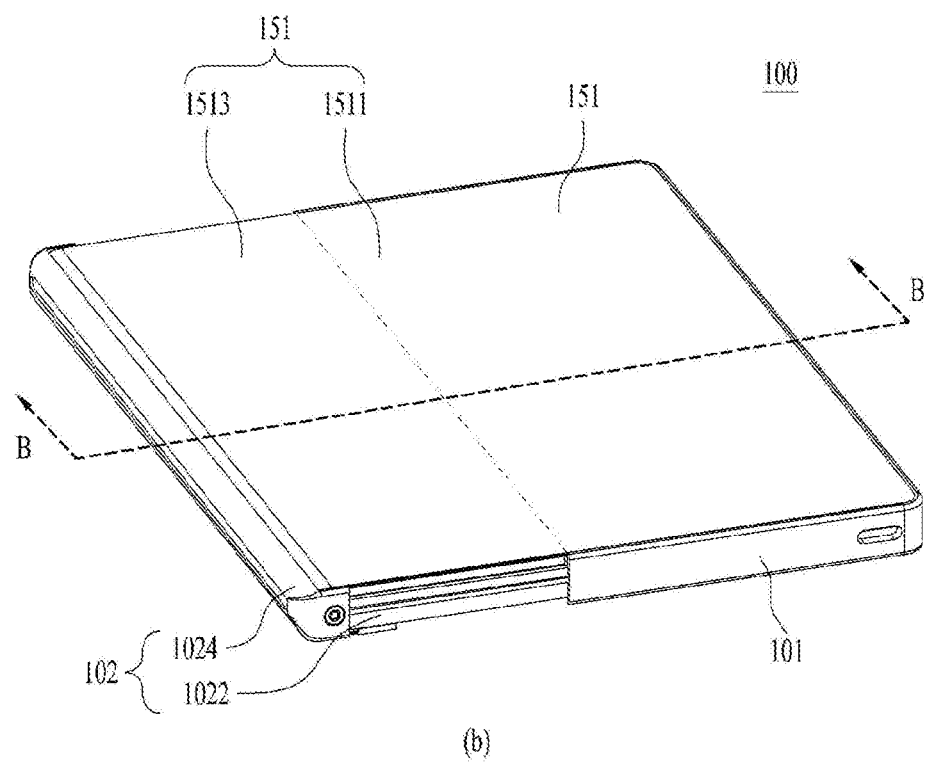
Figure 5:
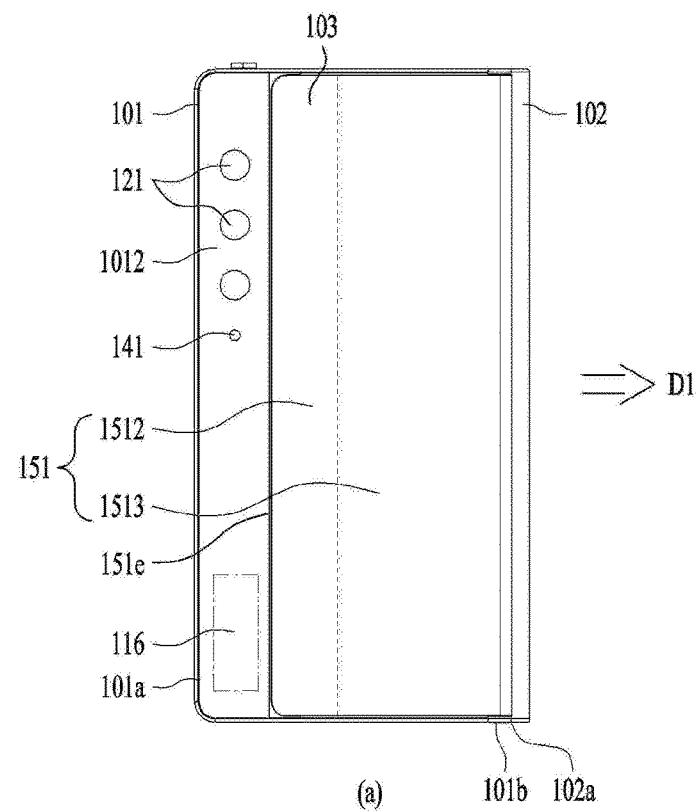
Figure 5:
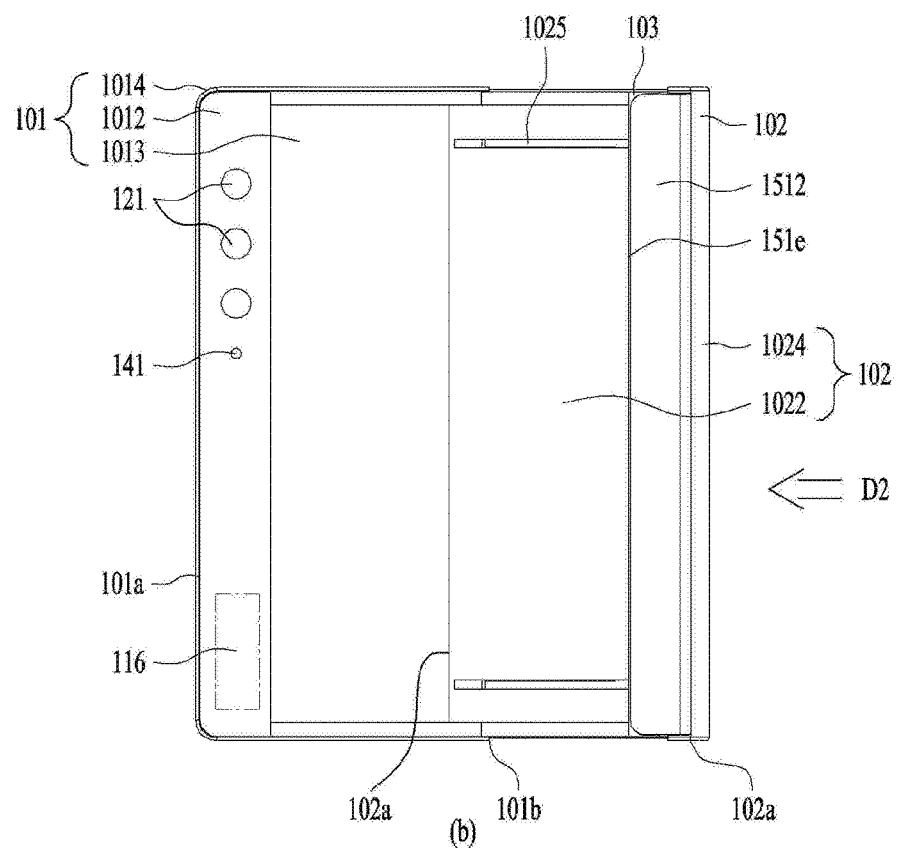

FIGS. 4 and 5 are a front perspective view and a rear view showing a first state and a second state of the mobile terminal 100 in accordance with the present disclosure. The mobile terminal 100 of the present embodiment may extend and retract in a first direction. The state in which the mobile terminal is in a retracted position as shown in FIG. 4(a) or 5(a) will be referred to as a first state, and the state in which the mobile terminal is in an extended position as shown in FIG. 4(b) or 5(b) will be referred to as a second state.

As shown in FIGS. 5(a) and 6(a), a mobile terminal 100 in the first state is retracted to have a smaller size than in the second state. In the first state, the size of the display unit 151, which is arranged on the front of the mobile terminal 100, is also smaller than in the second state. On the other hand, when the mobile terminal 100 in the first state is extended in the first direction, it may switch to the second state. In the second state, the size of the mobile terminal 100 and the size of the front portion of the display unit 151 are larger than those in the first state. In the following description, the direction in which the mobile terminal 100 and the display unit 151 thereof are extended or enlarged is defined as a first direction, and the direction in which the mobile terminal contracts or retracts or is reduced to switch from the second state to the first state is defined as a second direction. A direction perpendicular to the first and second directions is defined as a third direction.

The mobile terminal 100 of the present disclosure may switch from a first state, in which the display unit 151 is arranged on the front of the mobile terminal having a bar shape as shown in FIG. 4(*a*), to a second state by extending the screen as shown in FIG. 4(*b*). In the second state, the area of the front portion of the display unit 151 is increased and the area of the rear portion of the display unit 151 is reduced as shown in FIG. 5(*b*). That is, the display unit 151 positioned on the back of the mobile terminal 151 in the first state moves to the front of the mobile terminal 100 upon switching to the second state.

In this way, a flexible display unit 151 which is bendable may be used as the display unit such that the position of the display unit may be varied. The flexible display means a display, which is manufactured on a thin and flexible substrate capable of being curved, bent, folded, twisted or rolled like paper, and is thus lightweight and robust as not to be easily broken while maintaining characteristics of the existing flat panel display.

Also, electronic paper is based on a display technique to which a feature of a general ink is applied, and is different from the existing flat panel display in that it uses reflective light. The electronic paper may change information by using electrophoresis that uses a twist ball or capsule.

In a state that the flexible display unit 151 is not deformed (for example, the state that the flexible display unit 151 has an infinite radius of curvature, hereinafter, referred to as base state), a display area of the flexible display unit 151 becomes a plane. In a state (for example, the state having a finite curvature radius, hereinafter, referred to as a deformation state) deformed by an external force from the base state, the display area may be a curved surface. As shown, information displayed in the deformation state may be visual information output to the curved surface. This visual information is implemented as luminescence of unit sub-pixels arranged in a matrix arrangement is controlled independently. The unit sub-pixel means a minimum unit for implementing one color.

The flexible display unit 151 may be arranged in a bent state (for example, the state bent in a vertical or horizontal direction) not a flat state in the base state. In this case, if an external force is applied to the flexible display unit 151, the flexible display unit 151 may be deformed in a flat state (or less bent state) or a more bent state.

The flexible display unit 151 may implement a flexible touch screen in combination with a touch sensor. If a touch is performed for a flexible touch screen, the controller 180 (see FIG. 1) may perform a control corresponding to such a touch input. The flexible touch screen may be configured to sense a touch input even in the deformation state as well as the base state.

The touch sensor senses a touch (or touch input) applied to the touch screen by using at least one of various touch modes such as a resistive film mode, a capacitance mode, an infrared mode, an ultrasonic mode, and a magnetic field mode.

As an example, the touch sensor may be configured to convert a change of a pressure applied to a specific portion of the touch screen or a change of capacitance occurring in the specific portion to an electric input signal. The touch sensor may be configured to allow a touch target, which performs a touch on the touch screen, to detect a touch position, a touch area, a touch pressure and touch capacitance on the touch sensor.

The mobile terminal 100 may be provided with a deformation detection means configured to detect deformation of the flexible display unit 151. Such deformation detection means may be included in the sensing unit 140 (see FIG. 1).

The deformation detection means may be provided in the flexible display unit 151 or a case (first to third frame 101 to 103, which will described later) to detect information related to deformation of the flexible display unit 151. Here, the information related to the deformation may include a direction in which the flexible display unit 151 is deformed, a degree of deformation, a deformed position, a deformation time, and an acceleration at which the flexible display unit 151 returns from the deformed position to the original position. The information may further include various kinds of information that may be detected according to bending of the flexible display unit 151.

Also, the controller 180 may modify information displayed on the flexible display unit 151 or generate a control signal for controlling functions of the mobile terminal 100, on the basis of the information related to deformation of the flexible display unit 151 sensed by the deformation sensing means.

Switching of the flexible display unit 151 to a state (the first or second state), that is, change in size of the display unit 151 on the front and back of the mobile terminal 100 according to change in size of the mobile terminal 100 may be performed manually by the force exerted by the user, but is not limited to this manual operation. For example, the mobile terminal 100 or the flexible display unit 151 in the first state may be deformed to switch to the second state by a command from a user or an application without external force applied by the user. In order to automatically deform the flexible display unit 151 without external force, the mobile terminal 100 may include a drive unit, which will be described later.

The flexible display unit 151 of the present disclosure is bent 180 degrees by rolling around one of both side portions of the mobile terminal 100. Therefore, a part of the display unit 151 is disposed on the front of the mobile terminal 100 with respect to such a side portion, and the other part is disposed on the back of the mobile terminal 100. A part of the display unit 151 positioned on the front of the mobile terminal 100 may be immovably fixed on the front, and the other part thereof positioned on the back of the mobile terminal 100 may be movably arranged on the back.

In addition, the display unit 151 may be rolled or unrolled around the side portion, thereby moving a part thereof disposed on the back of the mobile terminal 100 to adjust the size of the region thereof disposed on the front of the mobile terminal 100. The flexible display unit 151 has a predetermined area and consists of one continuous body. Accordingly, as the area of the front portion of the flexible display unit 151 increases, the area of the rear portion of the flexible display unit 151 decreases. The display unit 151 configured as described above may be rolled in a second frame 102, which is movable with respect to a first frame 101, more specifically, around one side portion of the second frame 102, which will be described later. The display unit 151 may be withdrawn or pulled out or from the second frame 102 or inserted or pushed thereinto while being rolled around the second frame 102 according to movement of the second frame 102 to adjust the area of the display unit 151 on the front of the mobile terminal 100. This operation will described in more detail below in connection with the other related components of the mobile terminal 100.

Typically, an antenna is provided in the case or housing of the mobile terminal 100. However, a position where the antenna may be installed in the case or housing may be limited by the flexible display unit 151, which covers the front and back of the mobile terminal 100. For this reason, an antenna may be implemented on the flexible display unit 151. The antenna on display (AOD) is an antenna of a transparent film formed by laminating a patterned electrode layer and a dielectric layer. The AOD may be implemented to be thinner than when implemented with the conventional laser direct structuring (LDS) technique, which is implemented with copper nickel plating. Accordingly, the AOD may neither affect the thickness nor be exposed to the outside. In addition, with the AOD, the display unit 151 may directly transmit and receive signals. Therefore, the mobile terminal 100 provided with the display unit 151 on both sides as in the present disclosure may employ an AOD.

The mobile terminal 100 of the present disclosure may include a main frame on which components are mounted. The size of the main frame of the present disclosure may vary in the first direction as shown in FIG. 4. At least one frame may make a relative movement and the size thereof may vary in the first direction. Electronic components are mounted inside the main frame, and the flexible display unit 151 is disposed outside of the main frame.

As the mobile terminal 100 of the present disclosure includes the flexible display unit, the flexible display unit 151 may be coupled thereto in a manner of surrounding the front and rear surfaces of the main frame. The main frame may include first to third frames. The main frame may include a first frame 101, a second frame 102 movable in the first direction with respect to the first frame 101, and a third frame 103 movable in the first direction with respect to the second frame 102. The first frame 101 and the second frame 102 may each include a front portion, a rear portion and a side portion, and may be coupled to each other. Thus, the first and second frames 101 and 102 coupled to each other may define the appearance of the mobile terminal 100, which has a hexahedral shape. According to the configuration of the first to third frames 101 to 103, the second and third frames 102 and 103 may make a slide movement.

The first frame 101 may correspond to the main body of the mobile terminal 100 and define a space therein to accommodate various components. In addition, the first frame 101 may accommodate, in the defined space, the second frame 102 movably coupled to the first frame 101. The first frame 101 may include a first front portion (not shown) disposed on the front of the mobile terminal 100, and a first rear portion 1012 and a second rear portion 1013 disposed on the rear side of the mobile terminal 100.

The controller 180 and the power supply unit 190, which are components of the mobile terminal 100, may be accommodated in the space in the first frame 101. For example, the controller 180 may be a circuit board including a processor and an electronic circuit configured to control the operation of the mobile terminal, and the power supply unit 190 may include a battery and related components. The second frame 102 and the drive unit, which will be described later, may also be accommodated in the first frame 101.

As described above, the display unit 151 may have a continuous body and may be disposed on both the front and back of the mobile terminal 100 while being rolled in the mobile terminal 100. The display unit 151 may include a front portion positioned on the front of the mobile terminal 100, a rear portion positioned on the back of the mobile terminal 100, and a lateral side portion positioned between the front portion and the rear portion to surround the lateral side of the mobile terminal. The front portion and the rear portion may be flat, and the lateral side portion may form a curved surface. The flexible display unit 151 is likely to be broken when it is bent. Thus, the flexible display unit 151 may be configured to be bent with a predetermined curvature.

The display unit 151 may be divided into a fixed part and a variable part. The fixed part means a part fixed to the frame. Since it is fixed to the frame, the fixed part maintains a constant shape with a bending degree thereof unchanged. On the other hand, the variable part means a part in which the bending angle of the bent portion is variable or the position of the bent portion is changed. The variable part having a variable bending position or angle requires a structure to support the rear surface of the variable part according to the change.

A first region of the display unit 151 may be coupled to the first front portion, which corresponds to the front of the mobile terminal 100.

As shown in FIG. 4, the physical input unit 120 and the sensing unit 140, which are configured for operation of the mobile terminal 100, may be arranged in the first rear portion 1012. The display unit 151 may be disposed only on the second rear portion 1013. The first rear portion 1012 may remain exposed to the outside without overlapping the flexible display unit 151 regardless of the state of the mobile terminal. Accordingly, the input unit 120, which may include various buttons, switches, the camera 121, and a flash, and the sensing unit 140, which may include the proximity sensor 141, may be disposed on the first rear portion 1012. For a typical bar-type terminal, the display unit is arranged only on the front of the terminal. Therefore, a main camera is disposed on the back of the terminal to allow a user to photograph an object on the opposite side while viewing the object through the display unit. In addition, an auxiliary camera is required to be arranged on the front of the terminal in order for the user to photograph himself while viewing his image through the display unit.

However, for the mobile terminal 100 of the present disclosure, the display unit 151 is arranged on both the front and back of the mobile terminal 100. Accordingly, in photographing the user himself, a portion of the display unit 151 on the same surface as the camera 121, that is, the display unit 151 on the back of the mobile terminal 100 in the figure may be used. In photographing an object on the side opposing to the user, a portion of the display unit 151 on the opposite side of the camera 121, that is, the display unit 151 on the front of the mobile terminal 100 in the figure may be used. For this reason, the mobile terminal 100 may photograph an object located on the opposite side of the user or the user himself using one camera 121. The camera may include a plurality of cameras having different angles of view, such as wide angle, ultra wide angle, and telephoto angle. Not only the camera but also a proximity sensor and a sound output unit may be positioned on the first rear portion 1012, and an antenna 116 may be installed on the first rear portion 1012.

The side portion 1014 may extend along the edges of the first front portion, the first rear portion 1012, and the second rear portion 1013 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101.

As an example, the second frame 102 may be movably coupled to one of both side portions of the first frame 101, and accordingly the side portion 1014 is not formed on the side portions. Accordingly, the first frame 101 may include a first side portion 101*a*, which is substantially closed, and a second side portion 101*b*, which is disposed to face away from the first side portion 101*a* so as to be open. Since the side portion 1014 is exposed to the outside of the mobile terminal 100, the interface unit 160 for connecting a power port or an ear jack or the user input unit 123, such as a volume button, may be disposed on the side portion 1014. When the side portion 1014 contains a metal material, the side portion 1014 may serve as an antenna.

The second rear portion 1013 of the first frame 101 may be covered by the display unit, or may be disposed on the front of the display unit using a transparent material.

The display unit 151 may be bent 180 degrees by being rolled in the second frame 102 so as to be disposed on both the front and back of the mobile terminal 100. To implement such an arrangement of the display unit 151, the second frame 102 may include a roller rotatably disposed therein. The roller may be disposed at any position inside the second frame 102. However, the display unit 151 should be spread flat on the front and back of the mobile terminal 100 in order to provide a good quality screen to the user. Tom implement such spreading, appropriate tensional force should be applied to the display unit 151. In order to apply appropriate tensional force, the roller may be disposed at an end of the second frame 102 facing in the first direction. The roller may extends in the second direction and be rotatably coupled to the second frame 102.

The display unit 151 may be rolled around the roller while being gently curved at a predetermined curvature. The flexible display unit 151 may include a first surface configured to output an image and exposed to the outside and an inner surface arranged on the opposite side to face the frame. The roller may be arranged to freely rotate on the second frame 102 while contacting the inner surface of the display unit 151. Accordingly, the roller may substantially move the display unit 151 in a lateral direction of the mobile terminal 100, namely, a direction perpendicular to the longitudinal direction. As will be described later, when the second frame 102 slides, the display unit 151 may be moved with respect to the second frame 102 in different directions (i.e., the first direction or the second direction) toward the front or back of the mobile terminal 100 by the tensional force applied by the second frame 102. Such a movement may be guided by rotation of the roller.

Further, the roller is disposed on a first side portion of the second frame 102. The first side portion may substantially correspond to the outermost side portion of the mobile terminal 100. If the first side portion of the second frame 102 is exposed, the display unit 151 rolled around the roller may be damaged. Accordingly, the second frame 102 may include a side frame 1024 disposed on the first side portion.

The side frame 1024 may extend in the longitudinal direction of the second frame 102 to cover the first side portion, thereby protecting the roller and the display unit 151 rolled therearound. That is, the side frame 1024 covers the lateral side portion of the display unit 151. The lateral side portion is disposed in a third region. The first to third regions are at designated positions on the flexible display unit and the sizes or positions thereof do not change. On the other hand, the sizes of the front and rear portions and the position of the lateral side portion are determined according to the state of the main frame.

The first region and the second region may correspond to the fixed part described above. The third region may correspond to the variable part described above and the position thereof may vary depending on the state of the mobile terminal.

Since the lateral side portion is rolled by the roller, the lateral side portion may be curved at a predetermined curvature, and the inner side surface of the side frame may include a curved surface corresponding to the curvature of the lateral side portion.

The first side portion of the second frame 102 may be substantially closed by the side frame 1024. The side frame 1024 may substantially define the appearance of the mobile terminal 100 in cooperation with the side portion 1014 of the first frame 101. In addition, the second frame 102 may include a second side portion 102*b* that is open and disposed to face the first side portion to minimize interference with the components arranged in the first frame 101 during movement.

The second frame 102 may be movably coupled to the first frame 101, and may thus be configured to slide in the predetermined first or second direction with respect to the first frame 101. More specifically, as shown in the figure, the second frame 102 may be movably coupled to the first frame 101 via the side portion of the first frame 101, more specifically, the second side portion 101*b* that is open. More specifically, the second side portion 102*b* of the second frame may be disposed relatively adjacent to the first side portion 101*a* of the first frame 101, which is a closed portion, and thus the first side portion of the second frame may be disposed to face the first side portion 101*a*. Thus, the second side portion 102*b* is inserted into the first frame 101 through the side portion of the first frame, namely, the second side portion 101*b*. The first side portion 102*b* may remain outside the first frame 101 without being inserted into the first frame 101, thereby defining the appearance of the mobile terminal 100 as described above. However, when necessary, the first side portion 102*b* of the second frame 102 may also be inserted into the first frame 101.

Due to such a positional relationship, the second frame 102 may extend or retract from or to the first frame 101 in a direction perpendicular to the longitudinal direction of the mobile terminal 100 or the first frame 101. That is, the first and second directions may be perpendicular to the longitudinal direction of the mobile terminal 100 or the first frame 101. In other words, the first and second directions may be the lateral direction or horizontal direction of the mobile terminal 100 or the first frame 101. In addition, in the movement in the first direction, the second frame 102 may extend from the first frame 101. Thus, the first direction may be a direction in which the second frame 102 moves away from the first frame 101, namely, outwardly of the mobile terminal 100 or the first frame 101. In the movement in the second direction, the second frame 102 retracts into the first frame 101. Accordingly, the second direction may be a direction opposite to the first direction, and the second frame 102 may move closer to the first frame 101, that is, inwardly of the mobile terminal 100 or the first frame 101 in the second direction. When the second frame 102 is moved in the first direction, the second frame 102 may be extended to apply force to a part of the display unit 151 disposed on the back of the mobile terminal 100 such that the display unit 151 is further disposed on the front of the mobile terminal 100, and a region for such disposition may be formed. Accordingly, when moved in the first direction, the second frame 102 may switch the mobile terminal 100 to the second state in which the display unit 151 has a relatively extended front. On the other hand, when moved in the second direction, the second frame 102 may retract to the original position and apply force to a part of the display unit 151 disposed on the front of the mobile terminal 100 such that the display unit 151 returns to the back of the mobile terminal 100. Accordingly, when moved in the second direction, the second frame 102 may switch the mobile terminal 100 to the first state in which the display unit 151 has a relatively reduced front. Accordingly, the second frame 102 may selectively expose the display unit 151 on the front of the mobile terminal 100 according to the movement direction (i.e., the first or second direction or D2), thereby switching the mobile terminal 100 to the first or second state as defined above.

The third rear portion 1022 of the second frame 102 may be disposed below the second rear portion 1013 of the first frame 101. That is, the front surface of the third rear portion 1022 may face the rear surface of the second rear portion 1013. In addition, the rear surface of the second rear portion 1013 may contact the front surface of the third rear portion 1022 to stably support the movement of the second frame 102. By this arrangement, the third rear portion 1022 may be exposed to the outside of the first frame, specifically, the second rear portion 1013, and may be coupled to the display unit 151.

Alternatively, when the second rear portion 1013 is made of a transparent material, the second rear portion 1013 may define the rear appearance of the mobile terminal. The second rear portion 1013 may be arranged farther to the rear side than the third rear portion 1022 of the second frame. In the first state, the flexible display unit may be positioned between the second rear portion 1013 and the third rear portion 1022.

When the second rear portion 1013 is formed of a material such as transparent glass to define the rear appearance of the mobile terminal, the first rear portion 1012 may be implemented with the same member as the second rear portion 1013. That is, the camera 121, the flash or the sensing unit 140 may be disposed by partially coating the transparent glass plate member such that internal components are not visible and coating is not applied to necessary parts.

The first region 1511 may be disposed on the front of the mobile terminal 100, more specifically, the first frame 101, that is, the front surface of the first front portion 1011. The first region 1511 may be fixed to the front surface of the first frame 101, that is, the first front portion 1011 such that the first region 1511 does not move when the second frame 102 is moved. Thus, the first region 1511 may be constantly exposed on the front of the mobile terminal 100. The third region 1513 may be adjacent to the first region 1511 and may be extended into the second frame 102 and rolled around the roller. The third region 1513 may continuously extend out of the second frame 102 to partially cover the second frame 102, that is, the rear surface of the third rear portion 1022. Since the second frame 102, that is, the third rear portion 1022, is arranged adjacent to the first frame 101, that is, the second rear portion 1013 to form the rear case of the mobile terminal 100 in conjunction therewith, the third region 1513 may be disposed on the rear surface of the first frame 101.

The second region 1512 may be adjacent to the third region 1513 and disposed on the back of the mobile terminal 100, more specifically, the rear surface of the second frame, i.e., the third rear portion 1022 thereof. The second region 1512 may be coupled to the third frame 103 rather than being coupled directly to the second frame 102. As shown in FIG. 5(b), a slot 1025 extending in a lateral direction (i.e., a direction perpendicular to the longitudinal direction of the mobile terminal 100) may be formed in the second frame 102, that is, the third rear portion 1022, such that the third frame 103 may move along the slot 1025. While it is illustrated in FIG. 5(b) that the slot 1025 is formed in the rear surface of the second frame 102, it may be formed in the lateral side surface of the second frame 102. The second region 1512 may move together with the third frame 103 in the first or second direction or D2 with respect to the second frame 102, but the slot 1025 may limit the movement of the second region 1512 such that the movement take place within the rear surface of the mobile terminal 100. That is, the second region 1512 may not move beyond the second frame 102 when the second frame 102 extends or retracts. The second region 1512 may move a distance of extension or retraction of the second frame 102 along the slot 1025 within the second frame 102. Therefore, the second region 1512 may be constantly exposed on the back of the mobile terminal 100.

As a result, the first region 1511 may be disposed on the front of the mobile terminal 100 to remain exposed on the front regardless of the movement of the second frame 102, and the second region 1512 may be disposed on the back of the mobile terminal 100 to remain exposed on the back regardless of the movement of the second frame 102. In addition, the third region 1513 may be arranged between the first and second regions 1511 and 1512 so as to be selectively disposed on the front or back of the mobile terminal 100 according to the movement direction, D2 of the second frame 102.

Due to the selective disposition of the third region 1513, as shown in FIG. 4(b), the second rear portion 1013 of the first frame 101 may be covered by the second and third regions 1512 and 1513 of the display unit 151 and the third rear portion 1022 in the first state, and may be exposed to the outside of the mobile terminal 100 in the second state because the third region 1513 moves to the front of the mobile terminal 100 and the third rear portion 1022 moves in the first direction. In addition, the second front portion of the second frame 102 may be disposed below the first front portion 1011 of the first frame 101 in the first state, but may move out of the first frame 101 in the second state to support the third region 1513 of the display unit 151 disposed on the front of the mobile terminal 100.

Since the first and second regions 1511 and 1512 are constantly disposed on the front and back of the mobile terminal 100, the first region 1511 and the second region 1512 may have a constant curvature and remain flat. However, the third region 1513 may be bent by being rolled around the roller in the second frame 102. In switching from the first state to the second state, the third region 1513 may extend from the second frame 102 to the front of the mobile terminal 100 while being rolled around the roller in one direction. On the other hand, in switching from the second state to the first state, the third region 1513 may retract from the front of the mobile terminal 100 into the second frame 102 while being rolled around the roller in the opposite direction. Thereby, the third region 1513 may return from the second frame 102 to the back of the mobile terminal 100. A foldable mobile terminal that is unfoldable like a book is likely to be broken at a specific position thereon because it is repeatedly folded only at the specific position. On the other hand, a deformed portion of the flexible display unit 151, that is, a portion rolled around the roller, may vary according to the first and second states of the mobile terminal 100, that is, movement of the second frame 102. Therefore, the mobile terminal 100 of the present disclosure may significantly reduce deformation and fatigue repeatedly applied to a specific portion of the display unit 151, thereby preventing damage to the display unit 151.

Hereinafter, the overall operation of the mobile terminal 100 will be described based on the configuration described above. As an example, the state switching may be performed manually by a user. The operation of the mobile terminal 100 in the manual state switching is described below. However, the operation of the first to third frames 101 to 103 and the display unit 151 described below may be performed in the same manner even when a power source other than the force of the user, for example a drive unit, is employed.

As shown in FIGS. 4(*a*) and 5(*a*), in the first state, the second frame 102 is fully retracted into the first frame 101. Therefore, only the first region 1511 of the display unit 151 fixed to the front of the first frame 101 may be exposed on the front of the mobile terminal 100. The first region 1511 may be fixed to and supported by the first frame 101, that is, the first front portion thereof. In addition, most of the third region 1513 may be disposed on the back of the mobile terminal 100 together with the second region 1512, and may be disposed in the second frame 102 with a part thereof rolled around the roller. The third region 1513 on the back of the mobile terminal 100 may be supported by the second frame, that is, the third rear portion 1022 thereof. The second region 1512 may be fixed by the third frame 103 disposed on the second frame (i.e., the third rear portion 1022), and may be movably coupled to the second frame 102.

In this first state, when the second frame 102 moves in the first direction, the mobile terminal 100 may be switched to the second state. As shown in FIGS. 4(*b*) and 5(*b*), the second frame 102 may extend from the first frame 101 by moving in the first direction. In this case, the overall size of the mobile terminal 100, particularly, the front thereof may be increased. During the movement in the first direction, the second frame 102 may apply force, specifically, tensional force, to the display unit 151 in the first direction. The display unit 151 is fixed to the first frame 101 but is movably coupled to the second frame 102 through the third frame 103. Accordingly, the three region 1513 may be rolled out from the roller of the second frame 102 to the front of the mobile terminal 100 by the force applied by the second frame 102. That is, the third region 1513 may be withdrawn or pulled out, extended, or moved out from the second frame 102. At the same time, the third region 1513, in particular, a portion thereof disposed on the back of the mobile terminal 100, may be rolled into the roller of the second frame 102 from the back or the second frame 102 or be inserted or pushed, retracted, or moved into the second frame 102. Not all the third region 1513 may be withdrawn from the second frame 102 to the front of the mobile terminal 100, and a part of the third region 1513 may still remain rolled around the roller and disposed within the second frame 102. To allow the third region 1513 to smoothly move, the second region 1512 may move together with the third frame 103 in the first direction with respect to the second frame 102.

As described above, the second region 1512 and the third frame 103 may be constrained by the second frame 102 and may thus move together with the second frame 102 in the first direction with respect to the first frame 101. Accordingly, the second region 1512 and the third frame 103 may move in the first direction with respect to the first frame 101 as well as the second frame 102. Thereby, they move a distance longer than the movement distance of the second frame 102. Therefore, due to the long-distance movement of the second region 1512 in the first direction, the third region 1513 may smoothly extend to the front of the mobile terminal 100. In addition, in order to move the third region 1513 in proportion to extension of the second frame 102, the movement of the second region 1512 and the third frame 103 in the first direction and the movement of the third region 1513 and the second frame 102 in the first direction may be performed at the same time such that the movement of the second region 1512 and the third frame 103 is proportional to the movement of the third region 1513 and the second frame 102.

When the second frame 102 is fully extended in the first direction, the first and third regions 1511 and 1513 may be disposed on the front of the mobile terminal 100, and only the second region 1512 may be disposed on the back of the substrate. The first and third regions 1511 and 1513 may be supported by the first frame (i.e., the first front portion thereof) and the second frame (i.e., the second front portion thereof). In addition, while extending in the first direction, the second frame 102, that is, the third rear portion 1022 thereof may expose the second rear portion 1013 of the first frame and support the third region 1513 that is moving. Therefore, in the second state, the display unit 151 of the mobile terminal 100 may have an extended front surface.

On the other hand, when the second frame 102 in the second state moves in the second direction, the mobile terminal 100 may return to the first state as shown in FIGS. 4(*a*) and 5(*a*). The second frame 102 may retract to the first frame 101 by moving in the second direction. Thereby, the overall size of the mobile terminal 100, in particular, the front thereof may be reduced. The movement of the display unit 151 during the movement of the second frame 102 may be performed in a reverse order of the movement in the first direction described above. In brief, the third region 1513 may be rolled into the roller of the second frame 102 from the front of the mobile terminal 100 or may be inserted, retracted, or moved into the second frame 102. At the same time, the third region 1513 may be rolled out, withdrawn out, extended or moved from the roller of the second frame 102 to the back of the mobile terminal 100. Not all the third region 1513 may be withdrawn out from the second frame 102 to the back of the mobile terminal 100, and a part of the third region 1513 may be rolled around the roller and disposed within the second frame 102. In addition, in order to allow the third region 1513 to smoothly move, the second region 1512 may move together with the third frame 103 in the second direction with respect to the second frame 102. The second region 1512 and the third frame 103 may be constrained by the second frame 102 and may thus move together with the second frame 102 in the second direction with respect to the first frame 101.

Therefore, the second region 1512 and the third frame 103 may move in the second direction with respect to the first frame 101 as well as the second frame 102. Thus, they may move a distance longer than the movement distance of the second frame 102 in the second direction. Therefore, due to the long-distance movement of the second region 1512, the third region 1513 may smoothly return to the back of the mobile terminal 100. In addition, in order to move the third region 1513 in proportion to the retraction of the second frame 102, the movement of the second region 1512 and the third frame 103 in the first direction and the movement of the third region 1513 and the second frame 102 in the first direction may be performed at the same time such that the movement of the second region 1512 and the third frame 103 is proportional to the movement of the third region 1513 and the second frame 102. Once the second frame 102 is fully retracted in the second direction, the mobile terminal 100 may switch to the first state as described above. In the first state, the display unit 151 may have a reduced front surface compared to the front surface in the second state.

Figure 6:
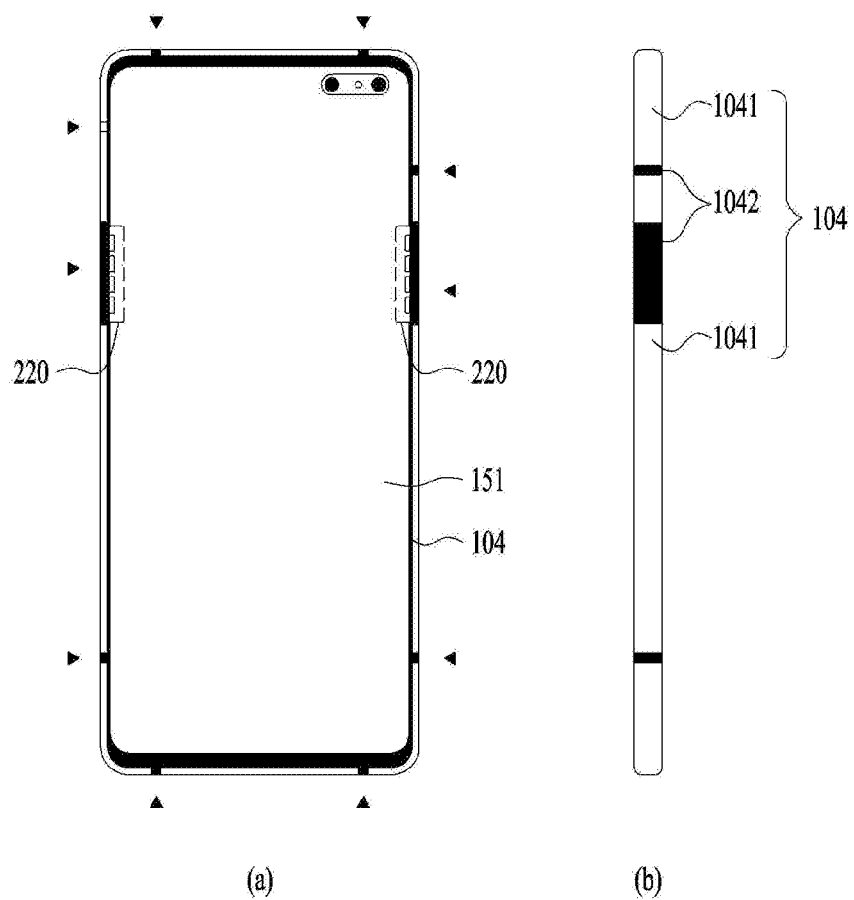
FIG. 6 is a view showing an example of a side case of the mobile terminal according to the embodiment of FIGS. 2 and 3.

FIG. 6 is a view showing an example of a side case 104 of the mobile terminal 100 according to the embodiment of FIGS. 2 and 3. As shown in FIG. 2, since the display unit 151 is arranged on the front of the bar-type mobile terminal 100, an antenna may be disposed on a lateral side of the mobile terminal 100 other than the front region. The side case 104, which defines the circumference of the lateral surface of the mobile terminal 100, may be manufactured by combining a conductive member 1041 containing a metal material and a non-conductive mold 1042 by a double injection technique. The non-conductive mold 1042 may be exposed to the outside through slits between the conductive members 1041. The individual conductive members 1041, which are partitioned by the non-conductive mold 1042, may serve as antenna radiators.

Figure 7:
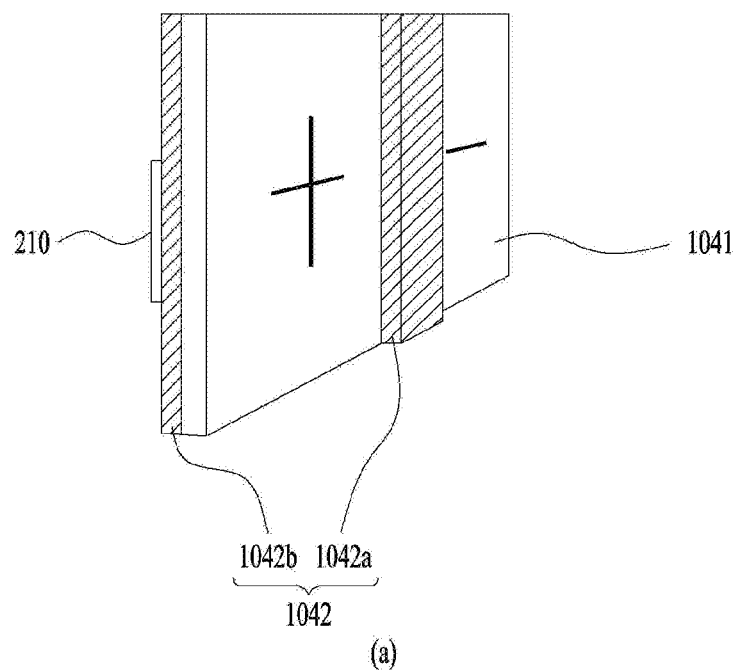
FIG. 7 is a view showing the outer side and inner side of a slit portion of the side case of the mobile terminal.
Figure 7:
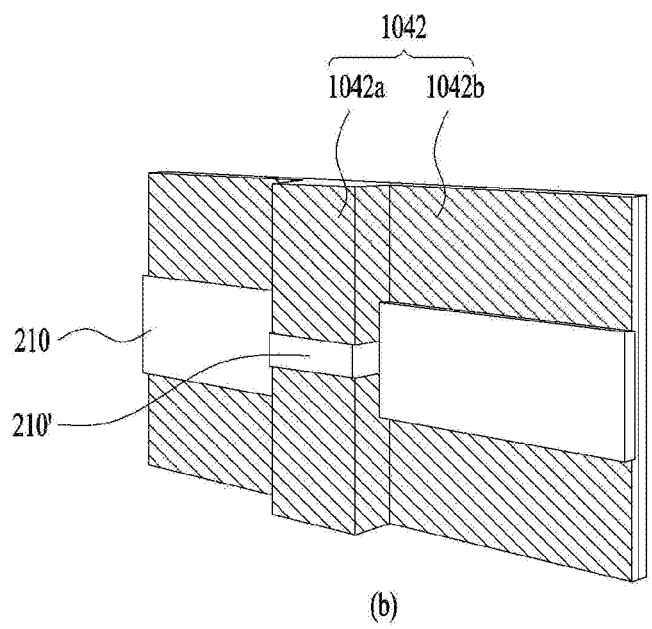

FIG. 7 is a view showing the outer side and inner side of a slit portion of the side case 104 of the mobile terminal 100. The non-conductive mold 1042 may extend up to the inner side surfaces of the conductive members 1041 because disposing the non-conductive mold only in the slit may not support bonding to the conductive member 1041. That is, the non-conductive mold 1042 may include an outer mold 1042a exposed to the outside through the slits and an inner mold 1042b positioned inside the conductive member 1041. The outer mold 1042a serves to connect a pair of conductive members 1041 and is therefore required to have high rigidity. Accordingly, as shown in FIG. 7(b), the outer mold 1042a may be formed to have a thickness greater than that of the inner mold 1042b such that the outer mold protrudes inward.

The side case 104 may be positioned inside and formed such that at least a part of the side case 104 is connected to a metal frame for supporting the display unit 151 and providing rigidity of the mobile terminal 100. Since the metal frame serves as the ground of the mobile terminal, the conductive members 1041 connected to the metal frame is connected to the ground and functions as antenna radiators to radiate a signal when power is applied thereto through a power supply.

As shown in FIG. 6, an antenna using the side case 104 may include a Wi-Fi antenna, a GPS antenna, and an antenna for mobile communication. The antenna may be disposed at a position other than the side case. An antenna for short-range wireless communication, such as an NFC antenna, may be used in a specific situation because it operates at a distance within 10 cm. Accordingly, it may be configured as a coil antenna and disposed on the back of the mobile terminal 100.

For the antenna for mobile communication, LTE antennas have been mainly used. Since different operators use signals of different frequency bands, multiple antennas of different lengths may be provided to use all signals of various frequency bands. As shown in FIG. 6, antennas for a low frequency band (LB) and a medium frequency band (MB) may be provided. Signals of multiple frequency bands may be transmitted and received through one antenna. A conductive pattern of a conductive material may be printed and connected to the conductive members 1041, or an antenna capable of operating in multiple bands may be implemented by providing a tuning circuit.

When signals are in the same frequency band, wireless communication of the signals may be performed using multiple antennas in a manner of multiple-input and multiple-output (MIMO). In MIMO, which is a wireless communication scheme that increases the transmission rate by increasing the wireless communication capacity by using multiple antennas, the number of antennas is further increased.

As 5G mobile communication was recently introduced as a new scheme, more antennas are required for 5G mobile communication. 5G mobile communication schemes include sub6, which uses centimeter waves (cmWave) of 2.5 GHz and 3.5 GHz bands, and New Radio (NR), which uses millimeter waves (mmWave) of 26 GHz or more. The former scheme uses a frequency band that does not deviate significantly from the high frequency band of the legacy LTE communication scheme, and thus antennas therefor may be implemented using the side case 104 like the conventional LTE antennas.

In sub6, the frequency band for antennas is lower than the frequency band of NR, and thus the antennas may be implemented using the side case 104 like the LET antennas. A conventional LTE antenna may also be used by connecting a matching circuit or a branch pattern to the LTE antenna, or a sub6 dedicated antenna may be additionally provided.

A monopole antenna, a dipole antenna, or a slot antenna is used as a conventional antenna using the side case 104, while an array antenna is used as an NR antenna. The array antenna may be used to transmit and receive signals in a manner (beamforming manner) of directing radiation in a specific direction by disposing multiple radiation patches at predetermined intervals and controlling power applied to each radiation patch. Accordingly, a plurality of radiation patches may be arranged side by side at predetermined intervals on one surface of an antenna substrate without using the side case 104, and a wireless communication chip configured to transmit a radio signal through the radiation patches may be mounted on the opposite surface of the antenna substrate. The array antenna 220 does not directly use the side case 104. However, arranging the array antenna 220 to overlap the conductive members 1041 of the side case 104 may degrade performance. For this reason, the non-conductive mold 1042 may be disposed at a portion of the side case 104 where the array antenna 220 is arranged. On the portion corresponding to the array antenna 220, the conductive members 1041 may be arranged with a relatively wide spacing formed therebetween, and the non-conductive mold 1042 may be designed in a color similar to that of the conductive members 1041 so as not to deteriorate the aesthetics of the outer appearance.

Figure 8:
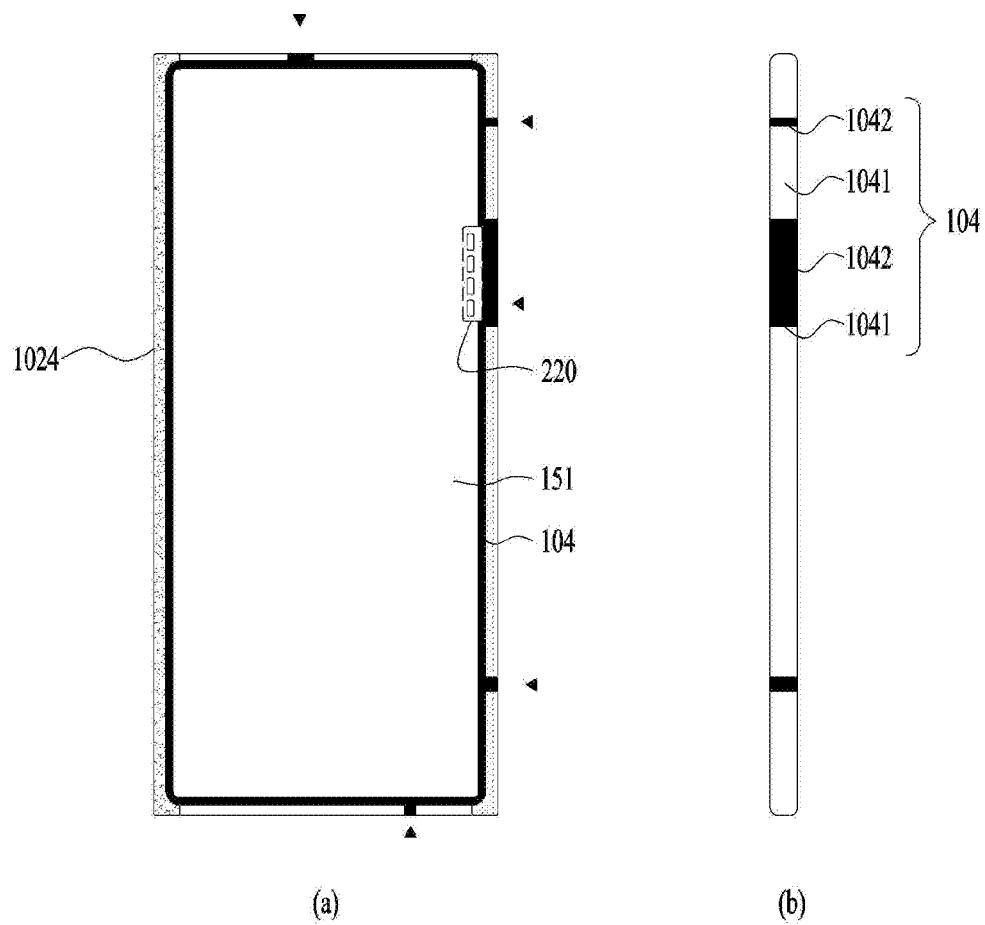
FIG. 8 is a view showing an example of a side case of the mobile terminal according to the embodiment of FIGS. 4 and 5.

Not only the antenna but also the user input unit 123, the audio output unit 152, the interface unit 160 into which a power/data cable is inserted, and a tray slot for mounting a SIM card may be disposed on the lateral surface of the mobile terminal 100. The space of the lateral surface of the mobile terminal 100 may be insufficient to arrange antennas for wireless communication in various schemes as well as components such as the user input unit. FIG. 8 is a view showing an example of the side case 140 of the mobile terminal 100 related to FIGS. 4 and 5. For the mobile terminal 100 in which a flexible display unit 151 is arranged to surround one side of the lateral sides shown in FIG. 7 (the left side in the figure), the space of the lateral surface may be more insufficient than the space on the lateral surface of the mobile terminal 100 described in the previous embodiment.

The array antenna 220 may be implemented (as an antenna on display (AOD)) by arranging a radiation patch on the display unit 151 in an overlapping manner. In this case, however, the radiation patch overlapping the display unit 151 may be visible depending on the incident angle of light, and the antenna performance may be lower than when the conventional substrate type structure is employed. Further, the size of the bezel may be increased as wiring for the antenna is added.

Accordingly, in the present disclosure, the user input unit 123 may be implemented with a force sensor 210. The force sensor 210 may be arranged to overlap the antenna unlike the conventional switch-type user input unit. Since the force sensor 210 is not a switch type input unit, it is not necessary to form a hole in the side case 104, and the force sensor 210 may be disposed on the inner side of the side case 104 as shown in FIG. 7(b). The force sensor 210 operates when pressure is applied thereto. Accordingly, the force sensor 210 may function as the user input unit 123 even when the force sensor 210 overlaps the conductive member 1041.

Figure 9:
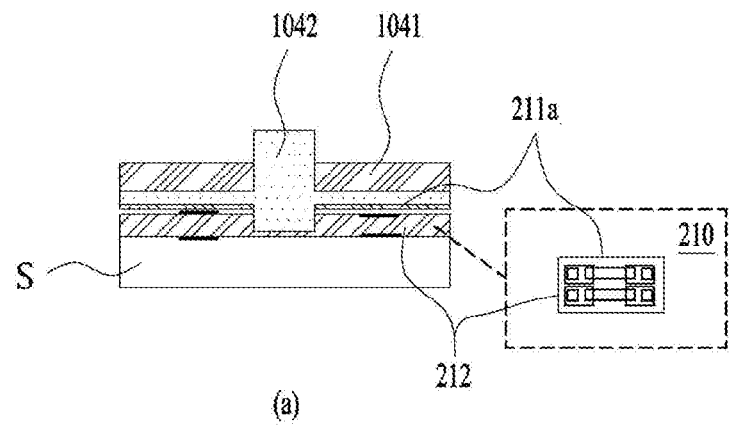
FIG. 9 a view showing an embodiment of a force sensor of the mobile terminal.
Figure 9:
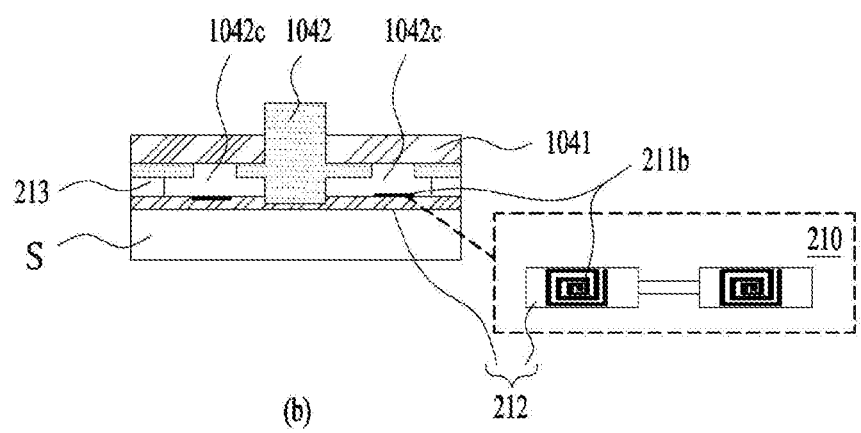
Figure 9:
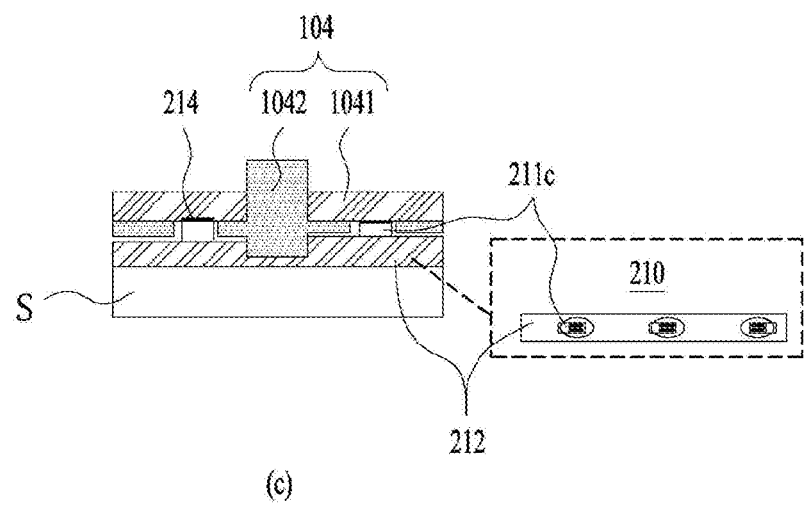

FIG. 9 is a view showing an embodiment of the force sensor 210 of the mobile terminal 100. FIG. 9(a) illustrates an embodiment of a strain gauge type force sensor 210, FIG. 9(b) illustrates an embodiment of an inductive force sensor 210, and FIG. 9(c) illustrates an embodiment of a microelectromechanical systems (MEMS) force sensor 210.

The strain gauge 211a of FIG. 9(a) may sense a pressure by sensing a change in resistance that takes place when elements disposed on the front and rear surfaces of a flexible member is deformed. For example, when a user presses a position of the side case 104 corresponding to the elements disposed on both surfaces of a flexible substrate 212, the pressure may be transmitted to deform the flexible substrate 212, and it may be determined whether a user input is provided based on the change in resistance of the elements. A spacer 213 may be further arranged spaced apart from the support structure S inside the mobile terminal 100 to allow the flexible substrate 212 on which the strain gauge 211a is mounted to deflect.

In order to sense the force applied by the user with high sensitivity, a portion of the side case 104 overlapping the force sensor 210 may be formed to be thin. For example, the thickness of the side case 104 may be reduced by forming, in the inner surface of the side case 104, a mounting groove in which the force sensor 210 is seated.

FIG. 9(b) is a view showing an embodiment of an inductive force sensor 210. The inductive force sensor may recognize a user input by sensing the current induced by change in distance between a sensing coil 211b and a metal layer spaced a predetermined distance from the sensing coil 211b. The conductive member 1041 of the side case 104 may be used as the metal layer, and an opening 1042c may be formed in the non-conductive mold 1042 at a position corresponding to the sensing coil 211b such that the conductive member 1041 and the sensing coil 211b face each other. When the user presses the side case 104, the conductive member 1041 is bent, and the current flows in the sensing coil 211b as the distance between the conductive member 1041 and the sensing coil 211b is reduced. A spacer 213 may be further provided to separate the sensing coil 211b and the side case 104 such that the distance between the conductive member 1041 and the sensing coil 211b may change.

In another embodiment, a MEMS sensor 211c may be used as shown in FIG. 9(c). Examples of the MEMS sensor 211c may include an ultrasonic sensor, which is configured to sense applied pressure based on ultrasonic waves. The MEMS sensor 211c may be attached to the conductive member 1041 using epoxy 214, and may sense a fine change generated when the user presses the side case 104.

The conventional switch type input unit is implemented by inserting a separate button such that the button protrudes compared to the side case 104, and thus allows the user to find the location of the user input unit 123 even without directly looking at the input unit. On the other hand, the user input unit 123 employing the force sensor 210 is not physically exposed to the outside, and accordingly the user input unit 123 needs to be differentiated such that the user may identify the position of the force sensor 210.

The outer mold 1042a of the non-conductive mold 1042 may be used to provide a tactile sense for this differentiation. The non-conductive mold 1042 and the conductive member 1041 may be formed of different materials, and the user may identify the position of the input unit at the boundary between the two members through visual and tactile senses.

Figure 10:
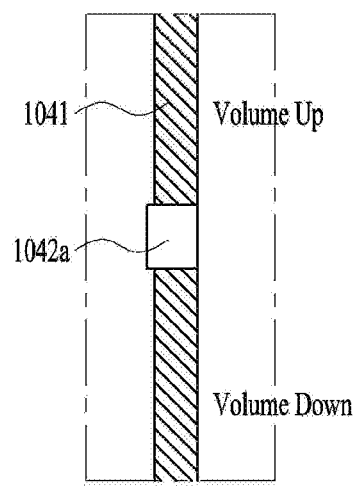
FIGS. 10 to 12 are views showing various embodiments of the side case of the mobile terminal.
Figure 10:
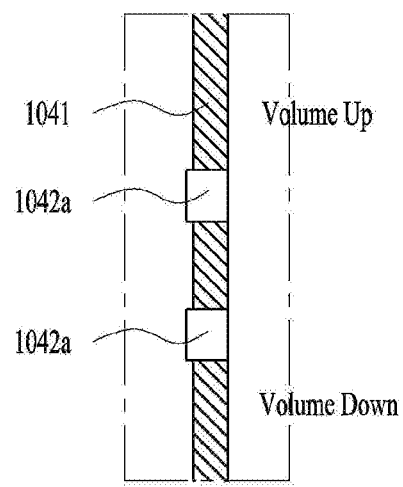
Figure 10:
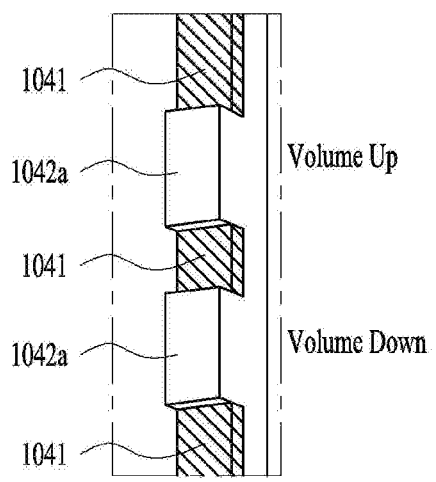
Figure 10:
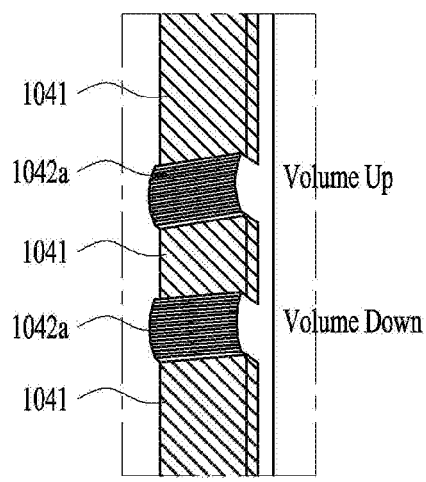
Figure 11:
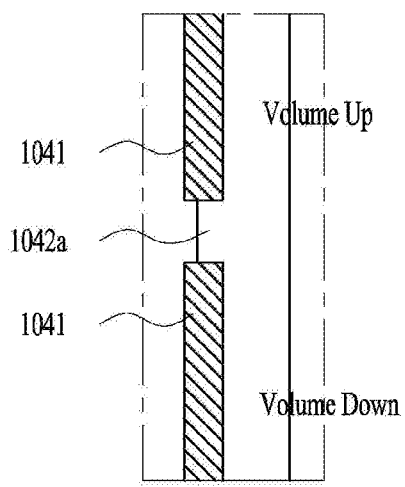
Figure 11:
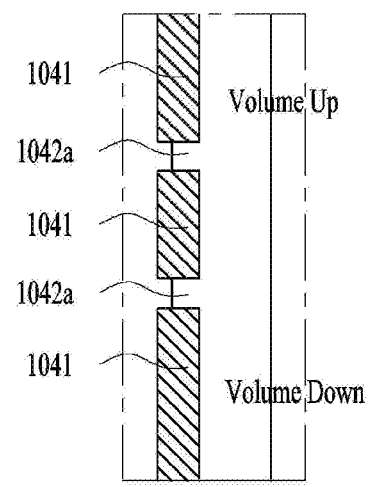
Figure 11:
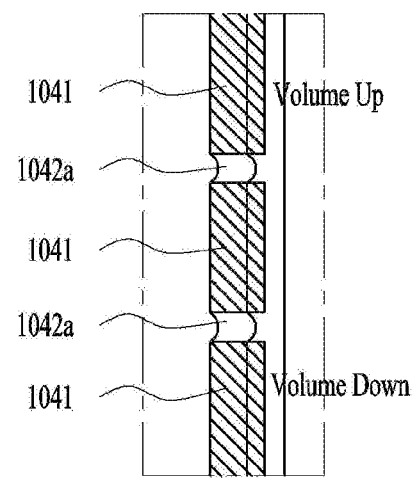
Figure 11:
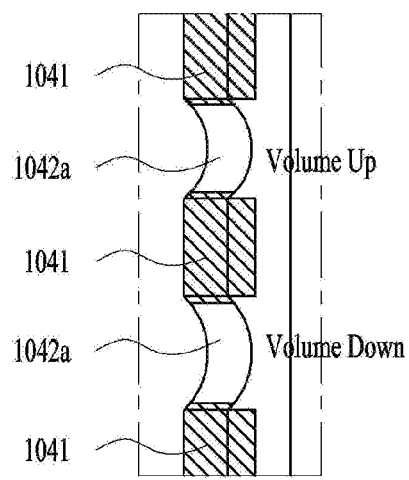
Figure 12:
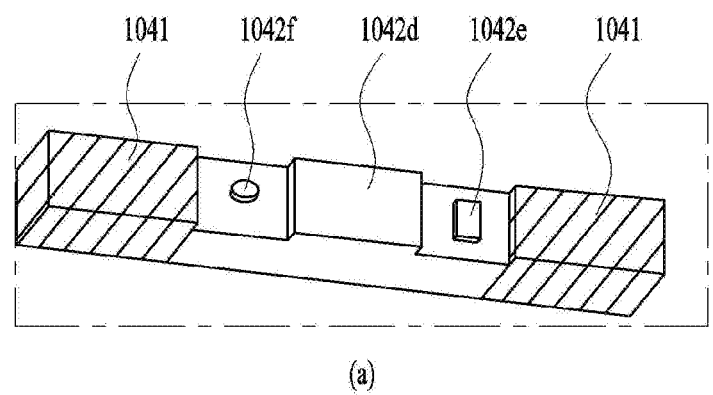
Figure 12:
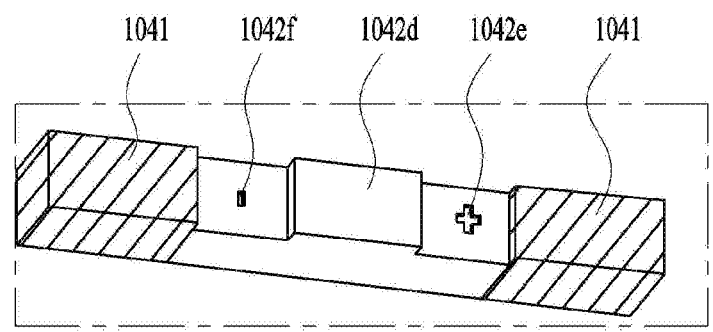

FIGS. 10 to 12 are views showing various embodiments of the mobile terminal 100 in which the position of the user input unit 123 is indicated using the outer mold 1042a exposed through the slit as described above.

FIG. 10 shows an embodiment in which the outer mold 1042a protrudes compared to the conductive member 1041. When multiple buttons are arranged adjacent to each other as in the case of the user input unit 123 for volume adjustment, the outer mold 1042a may be positioned between the force sensors 210 so as to protrude, as shown in FIG. 10(a). Alternatively, as shown in FIG. 10(b), multiple outer molds 1042a may be used to more clearly distinguish between the buttons.

Since it is not necessary to arrange the force sensor to overlap the conductive member 1041 except for the case of the inductive force sensor, the force sensor 210 may be disposed at a position where the outer mold 1042a is disposed, as shown in FIG. 10(c). When the area of the outer mold 1042a is large, a bump and a recess may be formed as shown in FIG. 10(d), and the position of the force sensor 210 may be clearly identified by the bump and recess. Accordingly, a curve may be formed in place of a step between the conductive member 1041 and the outer mold 1042a.

FIG. 11 illustrates an embodiment in which the outer mold 1042a is depressed compared to the conductive member 1041. One slit a or two slits b may be disposed between the user input units 123 to partition the positions of the user input units 123. As shown in FIG. 10(c), a curved surface may be formed on the outer mold 1042a to eliminate the step between the outer mold 1042a and the conductive member 1041. In the case where the size of the outer mold 1042a is increased as shown in FIG. 10(d), when the user presses a position corresponding to the outer mold 1042a, the force sensor 210 may sense the pressure.

The user input unit may be disposed to overlap a region where the outer mold 1042a having a large area is required as in the case of the array antenna 220 for millimeter waves. The array antenna 220 may be disposed inside the force sensor 210. As described above, the portion where the array antenna 220 is disposed may form the outer mold 1042a in a large region such that the conductive member 1041 does not overlap the array antenna 220. In FIG. 12, the outer mold 1042a may be stepped to indicate the position of the force sensor 210 overlapping the array antenna 220. Thereby, the positions of multiple user input units 123 may be distinguished from each other. Although it is shown in the figure that a portion 1042d between a pair of user input units protrudes and the left and right portions 1042c at which the user input units are located are recessed, the middle portion 1042d may be recessed and the left and right portions 1042c at which the force sensors 210 are positioned may be arranged to protrude. In order to indicate the function of each user input unit 123, a geometric figure or a character indicating the function may be marked in relief or intaglio as shown in FIG. 12.

Figure 13:
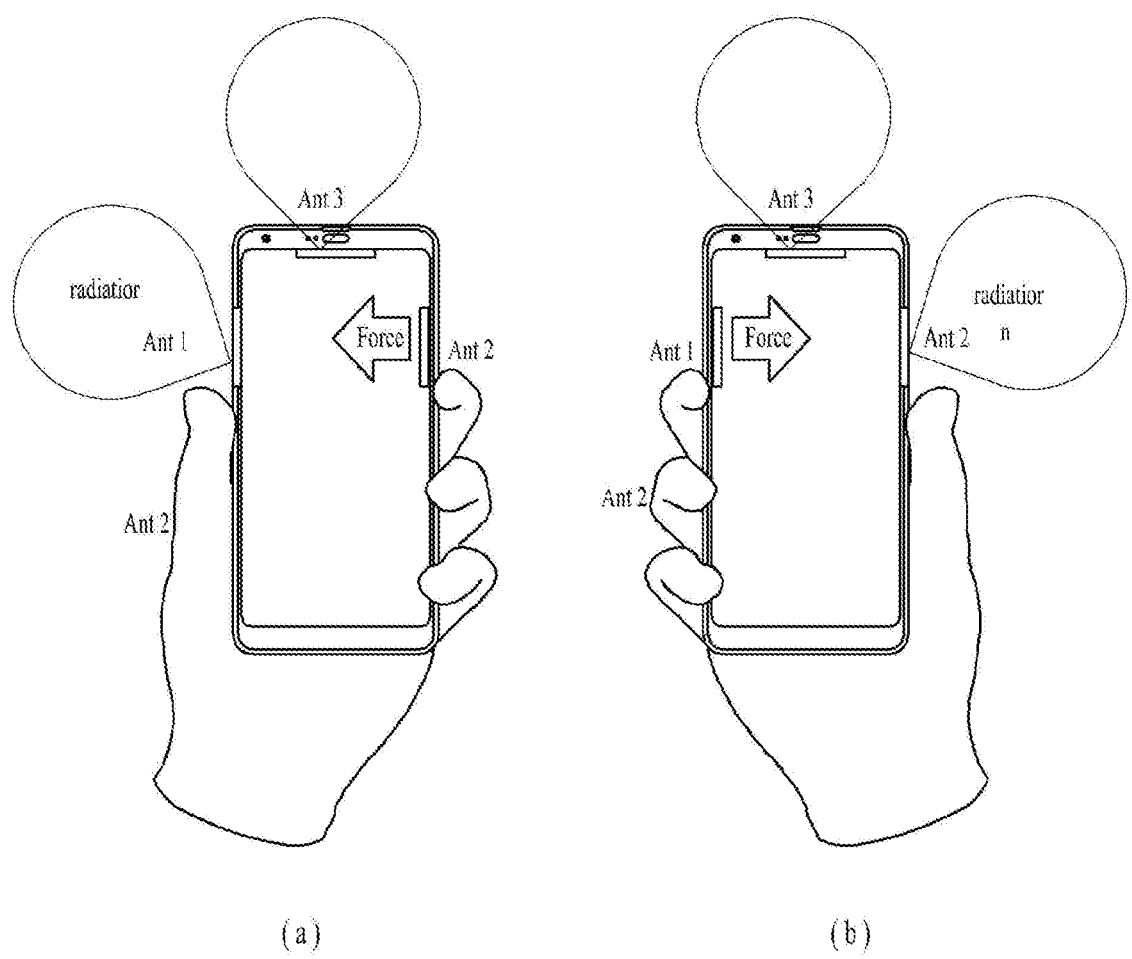
FIG. 13 illustrates a method of controlling an antenna module using a user input module in the mobile terminal of the present disclosure.

FIG. 13 illustrates a method of controlling the antenna module 220 using the force sensor 210 in the mobile terminal 100 of the present disclosure. The force sensor 210 and the antenna module 220 may be arranged to face in the left and right lateral directions of the terminal and be arranged on only one side, or may be disposed on the left and right sides as shown in FIG. 13. A power button as well as the volume button is needed. In the case of a mmWave antenna, beamforming is performed in a specific direction to transmit and receive signals, and therefore multiple antennas are needed to transmit and receive signals in various directions. Accordingly, the force sensor 210 and the antenna module 220 may be disposed in an overlapping manner on both the left side and the right side.

Since the force sensor 210 is capable of sensing even a weak pressure, it may sense a pressure when it is touched by a user's hand. When the sensed pressure is less than a reference pressure, the force sensor may not sense the pressure as a user input, but may determine the pressure as a simple touch of a user's hand. When the user's hand touches the force sensor 210, radiation performance of the antenna module 220 may be reduced. Accordingly, in this case, the operation of the antenna module 220 overlapping the corresponding force sensor 210 may be stopped and radiation may be performed through another antenna module 220.

An antenna module 220 for mmWave wireless communication may be disposed as an additional antenna module Ant3 at a position not overlapping the force sensor 210, for example, the back of the terminal. When pressure is sensed by the force sensor 210, an antenna module Ant1 or Ant2 overlapping the force sensor 210 may stop operating, and signals may be transmitted and received through the additional antenna module Ant3.

Only the mmWave antenna 220 is shown in the figures. In the case of an antenna using the side case, when pressure is sensed by the force sensor 210 overlapping the antenna, signals may be transmitted and received through another antenna for which pressure is not sensed by the force sensor.

The above embodiments should be construed in all aspects as illustrative and not restrictive. The scope of the disclosure should be determined by the appended claims and their equivalents, and all changes coming within the meaning and equivalency range of the appended claims are intended to be embraced therein.

What is claimed is:

1. A mobile terminal comprising:
a side case comprising a plurality of conductive members divided by a slit and an outer mold placed at the slit, the outer mold comprising a non-conductive material;
a display located on a front surface of the side case;
a rear case located on a rear surface of the side case;
a force sensor located inside the side case;
a wireless communication unit configured to transmit and receive a signal through the conductive members; and
a controller configured to perform a predetermined function when the force sensor senses a pressure,
wherein the outer mold includes an outer surface forming a plane that is different from planes formed by outer surfaces of the conductive members.

2. The mobile terminal of claim 1, wherein the force sensor is disposed at a position corresponding to the outer mold.

3. The mobile terminal of claim 2, wherein the outer mold has a size that is greater than or equal to a size of an area occupied by the force sensor.

4. The mobile terminal of claim 2, wherein a mark corresponding to a function set in the force sensor is formed on the outer mold.

5. The mobile terminal of claim 1, wherein the force sensor comprises a plurality of force sensors, and the outer mold is arranged between the plurality of force sensors.

6. The mobile terminal of claim 1, wherein:
the force sensor comprises a plurality of force sensors;
the outer mold covers all of the plurality of force sensors; and
externally facing positions of the outer mold corresponding to spaces between the plurality of force sensors and positions of the outer mold corresponding to the plurality of force sensors are uneven.

7. The mobile terminal of claim 6, further comprising:
an array antenna disposed at a position corresponding to the outer mold so as to overlap the force sensor.

8. The mobile terminal of claim 7, wherein a bump or a recess is formed in the outer mold.

9. The mobile terminal of claim 1, wherein the outer mold extends out above the outer surfaces of the conductive members.

10. The mobile terminal of claim 1, wherein the outer mold is recessed with respect to the outer surfaces of the conductive members.

11. The mobile terminal of claim 1, wherein the slit and the conductive members form a step or the non-conductive mold exposed through the slit comprises a curved surface.

12. The mobile terminal of claim 1, wherein:
the side case further comprises an inner mold arranged on an inner surface of the conductive members; and
the outer mold exposed through the slit is thicker than the inner mold.

13. The mobile terminal of claim 1, wherein:
the force sensor comprises a first force sensor arranged on a first side of the mobile terminal and a second force sensor arranged on a second side of the mobile terminal;
the wireless communication unit is connected to each of a first conductive member arranged on the first side and a second conductive member arranged on the second side; and
the controller is further configured to:
perform wireless communication through the second conductive member when a pressure is sensed by the first force sensor; and
perform wireless communication through the first conductive member when a pressure is sensed by the second force sensor.

14. A mobile terminal comprising:
a side case comprising a plurality of conductive members divided by a slit and an outer mold placed at the slit, the outer mold comprising a non-conductive material;
a display located on a front surface of the side case;

a rear case located on a rear surface of the side case;
a force sensor located inside the side case;
a wireless communication unit configured to transmit and receive a signal through the conductive members; and
a controller configured to perform a predetermined function when the force sensor senses a pressure,
wherein the outer mold includes an outer surface recessed with respect to outer surfaces of the conductive members.

* * * * *